US006927774B2

(12) United States Patent
Yano

(10) Patent No.: US 6,927,774 B2
(45) Date of Patent: Aug. 9, 2005

(54) CHARACTER DISPLAY DEVICE AND CHARACTER DISPLAY METHOD

(75) Inventor: Fumiko Yano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 148 days.

(21) Appl. No.: 09/731,850

(22) Filed: Dec. 8, 2000

(65) Prior Publication Data

US 2001/0000965 A1 May 10, 2001

Related U.S. Application Data

(63) Continuation of application No. PCT/JP99/02101, filed on Apr. 20, 1999.

(51) Int. Cl.[7] .............................................. G06T 11/00

(52) U.S. Cl. ....................... 345/469; 345/467; 345/468; 382/177; 382/181; 382/182; 382/198; 382/200; 382/229; 382/290

(58) Field of Search ................................ 345/469, 467, 345/468; 382/177, 181, 182, 198, 200, 229, 290

(56) References Cited

U.S. PATENT DOCUMENTS 5,414,448 A * 5/1995 Wada et al. ................ 345/469
5,559,938 A 9/1996 Van Roekel et al.
5,574,842 A * 11/1996 Takakura et al. ........... 707/542

FOREIGN PATENT DOCUMENTS

JP A62258495 11/1987
JP A2248994 10/1990
JP A4352193 12/1992
JP A5165455 7/1993
JP A10240956 9/1998
JP A10293569 * 11/1998 ................. 345/469

OTHER PUBLICATIONS

Office 97 WordArt Tool in Microsoft office and Word.*

* cited by examiner

*Primary Examiner*—Richard Hjerpe
*Assistant Examiner*—Faranak Fouladi
(74) *Attorney, Agent, or Firm*—Birch, Stewart, Kolasch & Birch, LLP

(57) ABSTRACT

A character display device and method therefor are adapted to obtain a proximal reference point of each character comprising a character series and calculate display coordinates of each character from said proximal reference point and the display angle and display reference position of the character series.

15 Claims, 21 Drawing Sheets

CHARACTER DISPLAY DEVICE AND CHARACTER DISPLAY METHOD

CROSS-REFERENCE TO THE RELATED APPLICATION

This Application is a continuation of International Application No. PCT/JP99/02101, whose International filing date is Apr. 20, 1999, the disclosures of which Application are incorporated by reference herein.

BACKGROUND OF THE INVENTION

1. Field of the Invention

The present invention relates to a character display device (hereafter character display) and method therefor which display characters on a display section of a personal computer or a navigation device or the like.

2. Description of the Related Art

FIG. 1 shows a conventional character display as for example disclosed in JP-A 4-352193. In the figure, reference numeral 1 denotes a character series designation means which designates a character series to be displayed on a display of a navigation device for example. 2 is a reference line designation means which designates a reference line (sloping line) which expands a character series. 3 is a character position determination means which determines an expansion position of a character series which is expanded on said reference line.

FIG. 2 is an expansion diagram explaining the expansion of a character series with respect to a reference line.

The operation of the conventional character display will be explained below.

When a character series is displayed on a display of a navigation device, firstly a user designates a character series to be the object of display using a character series designation means 1. When the character series to be the object of display is designated, a number (integer) of characters in said character series and a character width a of each character (the same value for all character) comprising the character series is determined.

When a user designates a character series to be displayed, a reference line which expands a character series is designated using a reference line designation means 2. The designation of the reference line is performed by inputting reference coordinates for the initial point ($x_0$, $y_0$) and the final point ($x_1y_1$) of the sloping line acting as the reference line.

In this way, when a character series to be the object of display and a reference line are designated, a character position determining means 3 calculates a lower left coordinate (hereafter character coordinate) of each character using the lower left of the screen as an origin (0, 0), when the character series is expanded on a straight line in a horizontal direction.

The coordinates (x', y') of the nth character A in a character series expanded on a straight line in a horizontal direction are calculated as follows:

$$x'=x_0+(n-1)a$$

$$y'=y_0$$

The character position determination means 3 calculates the character coordinates of each character in a character series expanded in a straight line in a horizontal direction and then calculates the character coordinates of each character when the character series is rotated by a slope α of a reference line about the initial point ($x_0$, $y_0$) of the character series.

The coordinates (x, y) of the nth character A in a character series expanded on a reference line are calculated as follows:

$$x=x_0+(n-1)a\cdot\cos\alpha$$

$$y=y_0+(n-1)a\cdot\sin\alpha$$

Since the conventional character display is constructed as discussed above, it is possible to display character series at an arbitrary slope. However when the character series is sloped on display, it is necessary to rotate each character comprising the character series. Thus the problem has arisen that the dot pattern forming each character destroyed by such variation (when the rotational angle of the character is 90°, 180°, 270°, there is no variation in the dot pattern even if the characters are rotated). Therefore the presentation of the characters has suffered as a result.

Furthermore, since the character width a of each character comprising the character series calculates the character coordinates on the basis that they are normally the same, for example when narrow characters such as “i” and “l” are present, one section of the character series will be distorted and the presentation of the character series will suffer as a result.

SUMMARY OF THE INVENTION

The present invention is proposed to solve the above problems and has the object of providing a character display device and method therefor which can display a character series with superior presentation even when the character series is displayed on a slope.

The character display of the present invention is provided with a coordinate calculation means obtains a proximal reference point for each character which comprises a character series from a recording means. The coordinate calculation means calculates the display coordinates of each coordinate from a display angle, a display reference point and said proximal reference point of the character series.

In this way, even when the character series is displayed on a slope, it is possible to display the series with superior presentation.

The character display of the present invention is provided with a display means and a coordinate calculation means which select a normal character or a sloped character depending on a display angle of said character series and which obtains a dot pattern and proximal reference point of the selected character. The characters are selected from the recording means which records a dot pattern and a proximal reference point of a sloping character which slopes at an arbitrary angle apart from normal non-sloping characters.

As a result, it is possible to display characters series with superior presentation even when the character series is displayed in a sloping manner.

The character display of the present invention is provided with a coordinate calculation means and display means which compare a display angle of a character series and a sloping angle of normal characters and sloping characters and which select a normal character or sloping character which have an angle of slope most closely approximating the display angle.

In this way, it is possible to further improve the presentation of a character series by selecting characters which are most suitable to the display angle.

The character display of the present invention is provided with an input means which inputs a character series to be the object of display, as well as a display angle and a display reference position of the character series.

In this way, a user can display a character series at an arbitrary angle by commands.

The character display of the present invention is provided with a reading means which reads the display angle and display reference position of a character series to be the object of display recorded in a memory.

In this way, it is possible to display a preset character series at an arbitrary angle.

The character display method of the present invention comprises the steps of obtaining a proximal reference point of each character comprising a character series and calculating a display coordinate for each character from the display angle, display reference position and proximal reference point of the character series.

In this way, it is possible to display a character series with superior presentation even when the character series is displayed in a sloping manner.

The character display method of the present invention comprises the further steps of selecting a normal character or a sloped character depending on a display angle of said character series and obtaining a dot pattern and proximal reference point of the selected character. The characters are selected from the recording means which records a dot pattern and a proximal reference point of a sloping character which slopes at an arbitrary angle apart from normal non-sloping characters.

As a result, it is possible to display characters series with superior presentation even when the character series is displayed in a sloping manner.

The character display method of the present invention comprises the further steps of comparing a display angle of a character series and a sloping angle of normal characters and sloping characters and selecting normal characters or sloping characters which have an angle of slope most closely approximating the display angle.

In this way, it is possible to further improve the presentation of a character series by selecting characters which are most suitable to the display angle.

The character display method of the present invention comprises the further step of inputting a character series to be the object of display, as well as a display angle and a display reference position of the character series.

In this way, a user can display a character series at an arbitrary angle by commands.

The character display method of the present invention comprises the further steps of reading the display angle and displaying reference position of a character series to be the object of display recorded in a memory.

In this way, it is possible to display a preset character series at an arbitrary angle.

PREFERRED EMBODIMENTS OF THE INVENTION

In order to explain the invention in greater detail, the preferred embodiments are outlined below with reference to the accompanying figures.

Embodiment 1

Figure 1:
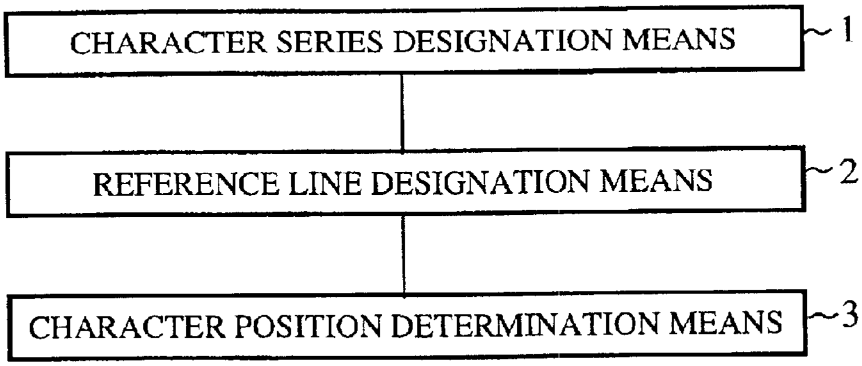
FIG. 1 (PRIOR ART)
FIG. 1 is a drawing of a conventional character display.
Figure 2:
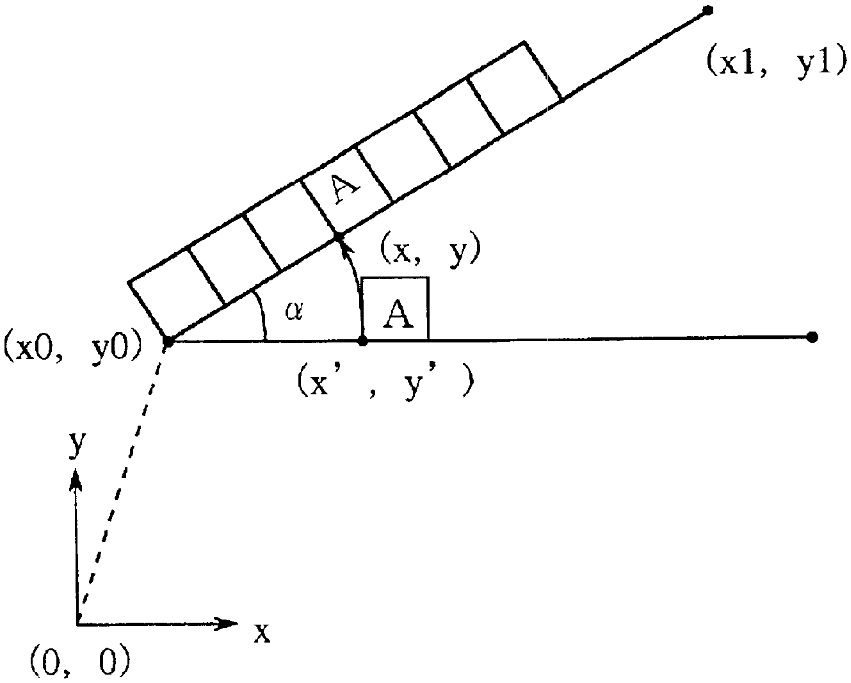
FIG. 2 (PRIOR ART)
FIG. 2 is an expanded diagram explaining the expansion of a character series with respect to a reference line.
Figure 3:
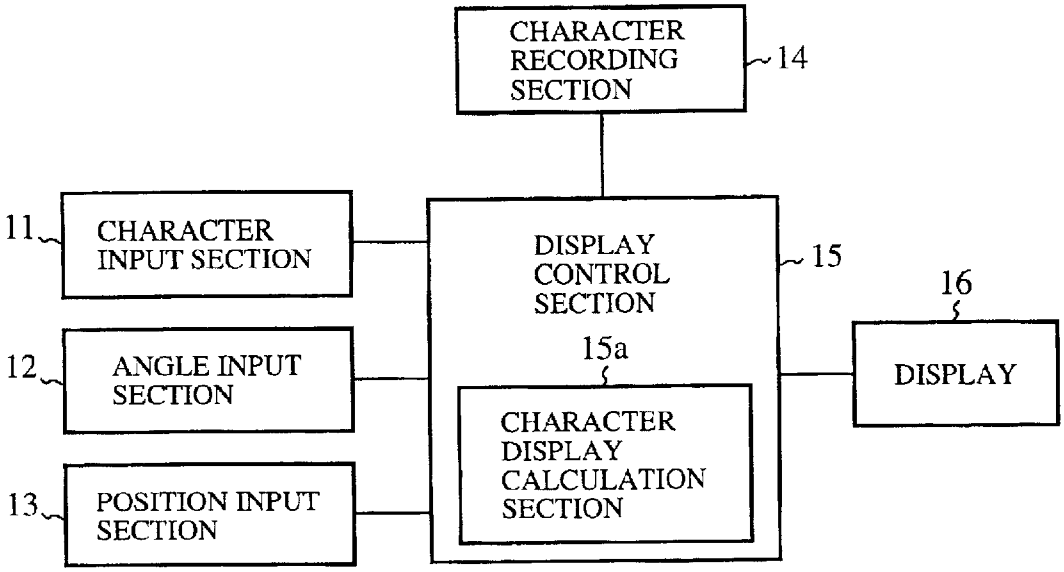
FIG. 3 is a figure showing a character display according to a first embodiment of the invention.

FIG. 3 shows a character display according to a first embodiment of the invention. In the figure, reference numeral 11 denotes a character input section (input means) which inputs a character series to be the object of display. 12 is an angle input display (input means) which input a display angle of a character series. In the first embodiment, the following eight angles may be input: 0°, 45°, 90°, 135°, 180°, 225°, 270°, and 315°.

13 is a position input section (input means) which inputs the display reference position of a character series (for example the center coordinate of a character series). 14 is a character recording section (recording means) which records dot patterns and proximal reference points of sloping characters having an arbitrary angle of slope and of normal non-sloping characters. 15 is a display control section (coordinate calculation means, display means) which has a character display calculation section 15*a* which obtains a proximal reference point for each character comprising a character series from a character recording section 14 and which calculates the display coordinates of each character from the display angle, the display reference position and the proximal reference point of the character series. When the character display calculation section 15*a* calculates a display position of each character, the display control section 15 obtains dot patterns for each character comprising a character series from the character recording section 14 and gives commands to the display section 16 to display each character in its display position.

The operation of the invention will be discussed below.

Figure 4:
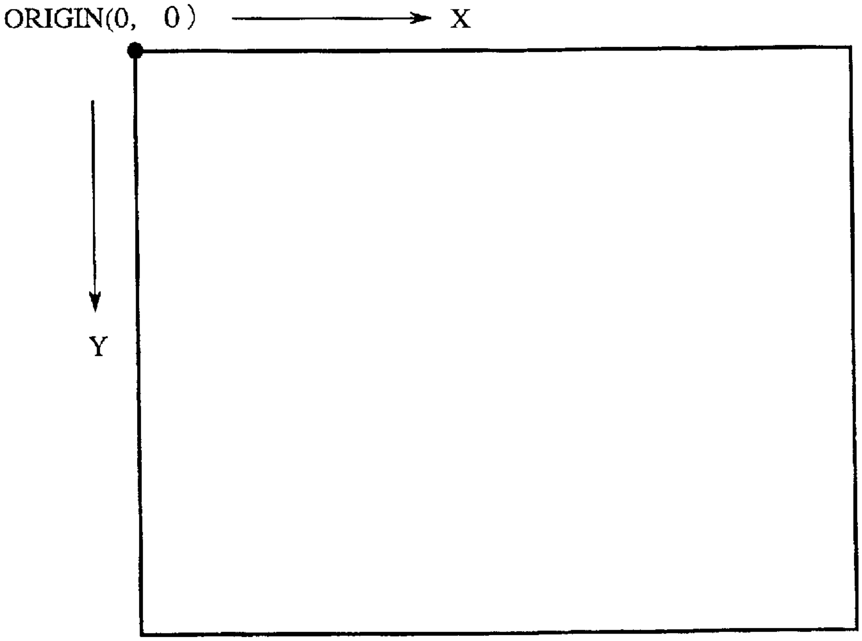
FIG. 4 is a diagram of a screen of a display.

Initially, the discussion will center on the display section 16. As shown in FIG. 4, the display section 16 takes the origin (0, 0) to be the lower left of the screen. The x axis is in the positive right direction and the y axis is in the positive lower direction.

Figure 5:
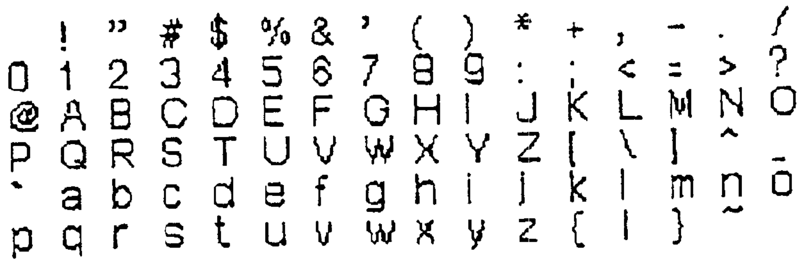
FIG. 5 is an explanatory diagram of character data recorded in a character recording section.
Figure 6:
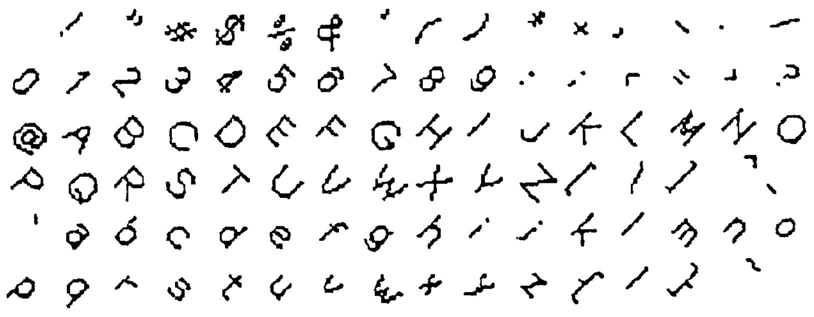
FIG. 6 is an explanatory figure showing character data recorded in a character recording section.

Next the character recording section 14 will be explained with reference to recorded dot patterns (hereafter character data). The character recording section 14 records character data with respect to normal non-sloping characters (refer to FIG. 5) and to sloping characters sloping at an angle of 45° (refer to FIG. 6).

Figure 7:
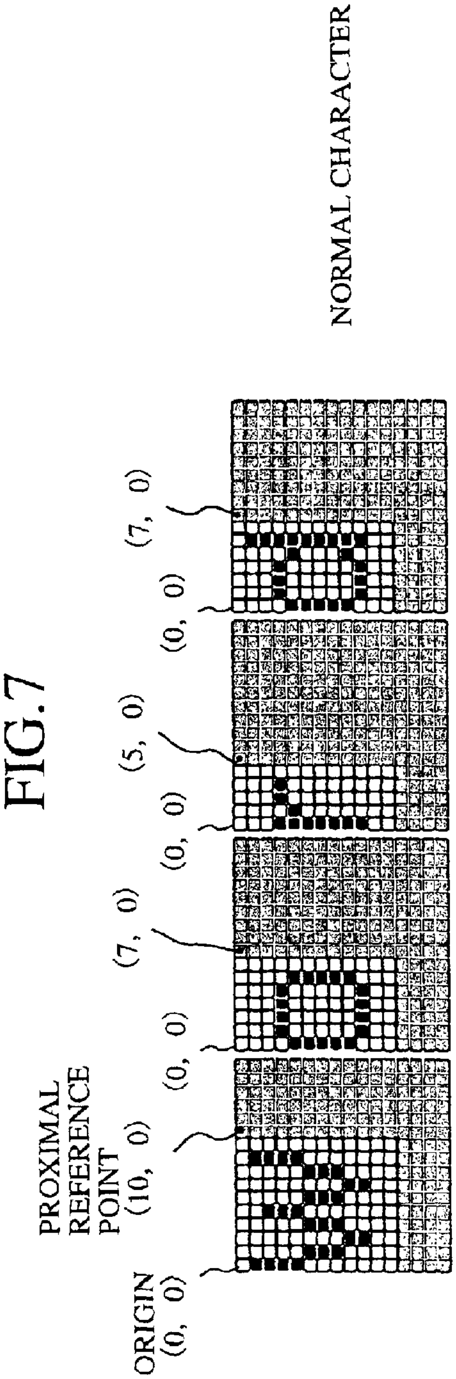
FIG. 7 is an enlargement of character data for normal characters.
Figure 8:
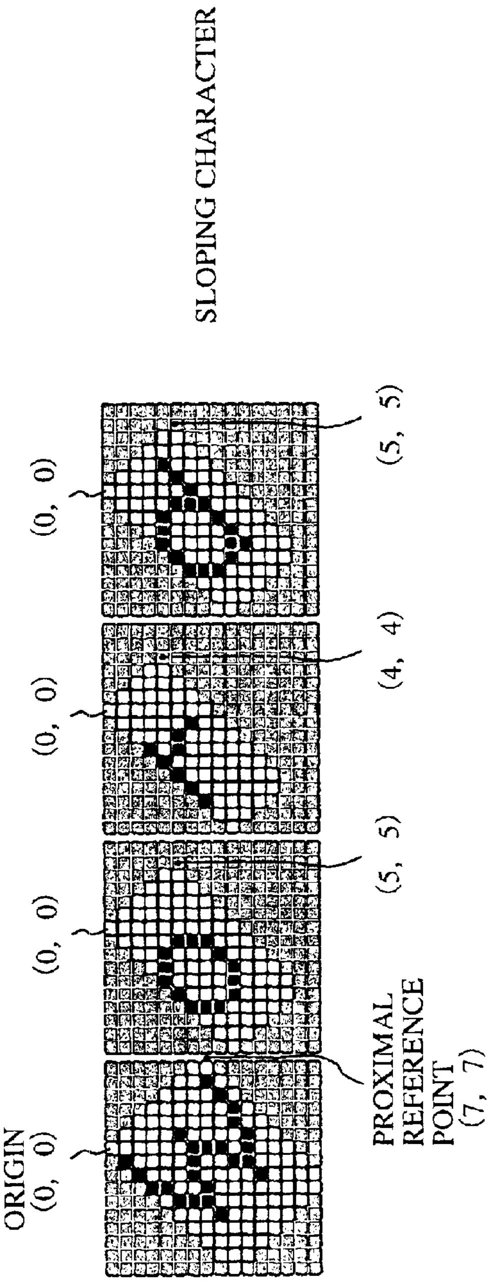
FIG. 8 is an enlargement of character data for sloping characters.

FIG. 7 and FIG. 8 are enlargements showing character data for normal and sloping characters for the character series "word". The character size for each character recorded by the character recording section 14 is all 16×16 dots and each character has a fixed effective range.

Figure 9:
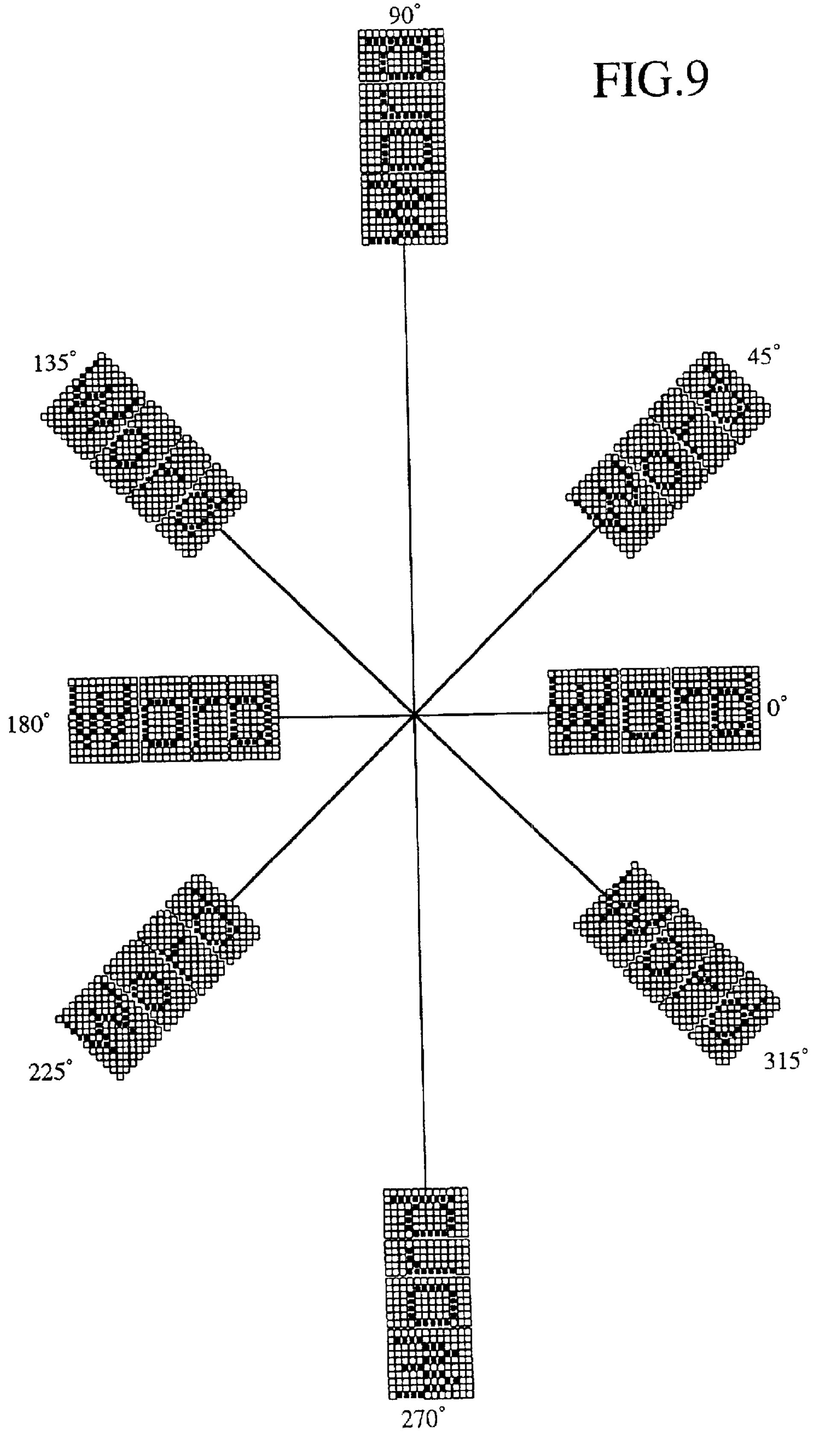
FIG. 9 is a diagram of a display of a character series.

In other words, the character recording section 14 as shown in FIG. 7 and FIG. 8 takes the lower left of the character as the origin (0, 0). Coordinate values for display reference points (proximal reference points) for the next character to the right of each character are recorded by linking to each character data. For example the proximal reference point for the normal character "W" is (10, 0) and the proximal reference point of the sloping character "W" is (7, 7). When the character series is displayed, display is performed according to the proximal reference points as shown in FIG. 9.

Next a concrete operation of a character display will be discussed.

A user operates the character input 11, the angle input 12 and the position input 13 and inputs the character series to be displayed, the display angle of the character series and the display reference position of the character series.

For example, when "Word" is input as a character series, 0° is input as a display angle and (50, 50) is input as a display reference position, the character display calculation section 15*a* of the display control section 15 obtains proximal reference points for normal characters from the character recording section 14 (since the display angle is 0°). Firstly, taking the display of the character series on an origin (0, 0), the display coordinates of each character (the upper left of each character) and the lower right coordinates of the character series are calculated.

If the display coordinates of "W" are taken from an origin (0, 0), then from the proximal reference point (10, 0) of "W", the display coordinates of "o" are (10, 0), from the proximal reference point (7, 0) of "o", the display coordinates of "r" are (17, 0), from the proximal reference point (5, 0) of "r", the display coordinates of "d" are (22, 0), and from the proximal reference point (7, 0) of "d", the lower right coordinates (x, y) of "d" are given as below:

$$x=22+7=29$$

$$y=0+12=12$$

Figure 10:
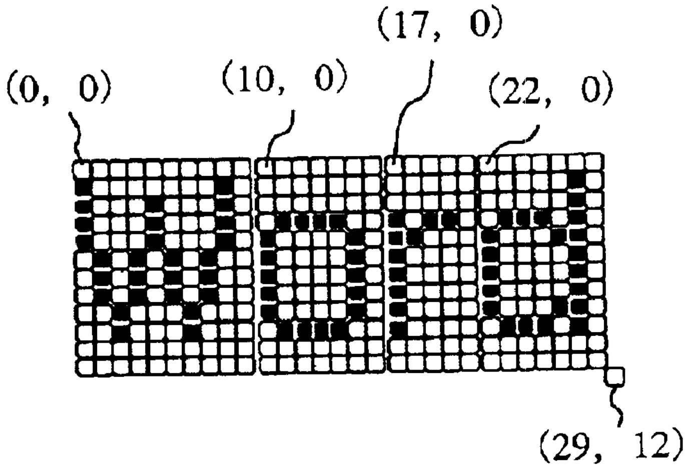
FIG. 10 is an explanatory diagram of character coordinates of a character series.

Thus when the character series is displayed at an origin of (0, 0), the display coordinates are as shown in FIG. 10.

Next the character display calculation section 15*a* of the display control section 15 calculates central coordinates of a character series from upper left coordinates (0, 0) for the character series "Word" and lower right coordinates (29, 12). The central coordinates (x, y) of the character series are calculated as shown below:

$$x=29/2\approx15$$

$$y=12/2=6$$

Figure 11:
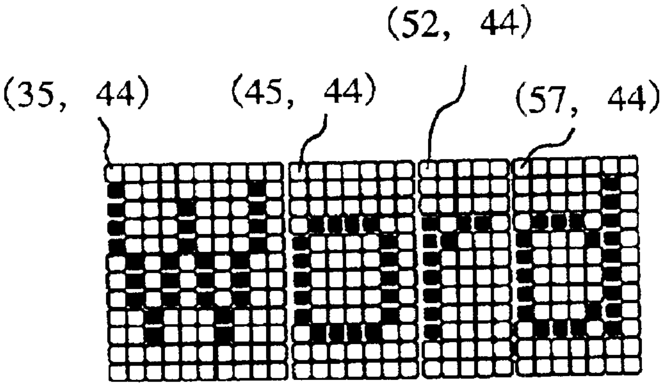
FIG. 11 is an explanatory diagram of character coordinates of a character series.

In this way, when the character series "Word" is displayed at a display reference position (50, 50) with a display angle of 0°, the display coordinates of each character are as shown in FIG. 11.

In this way, when calculating the display coordinates of each character, the display control section 15 reads character data for normal characters "W", "o" "r" "d", from the character recording section 14 and displays each character comprising the character series on the display 16 (refer to FIG. 11). In this way, a series of operations are completed.

Next the display of sloping characters will be discussed. For example, when the character series "Word" is input as a character series with a display reference position (50, 50) and a display angle of 315°, the character display calculation section 15*a* of the display control section 15 obtains proximal reference points for sloping characters from the character recording section 14 (since the display angle is 315°). Firstly, taking the display of the character series on an origin (0, 0), the display coordinates of each character (the upper left of each character) and the lower right coordinates of the character series are calculated.

If the display coordinates of "W" are taken from an origin (0, 0), then from the proximal reference point (7, 7) of "W", the display coordinates of "o" are (7, 7), from the proximal reference point (5,5) of "o", the display coordinates of "r" are (12, 12), from the proximal reference point (4, 4) of "r", the display coordinates of "d" are (16, 16), and from the proximal reference point (5, 5) of "d", the lower right coordinates (x, y) of "d" are given as below:

$$x=16+5-9=12$$

$$y=16+5+9=30$$

Figure 12:
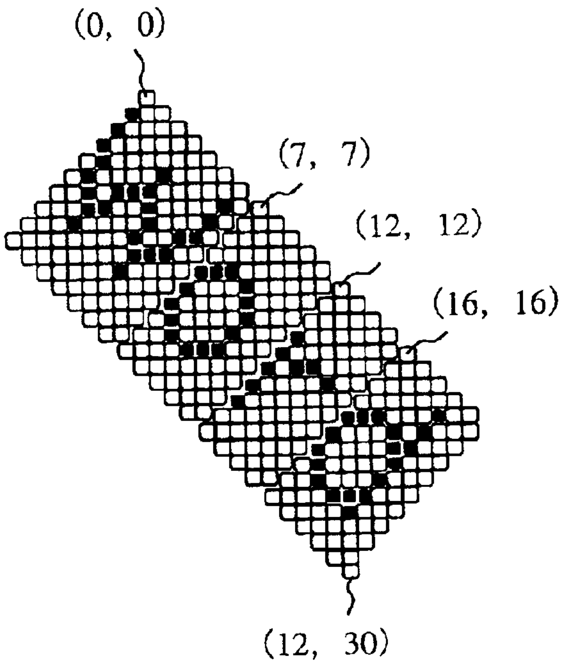
FIG. 12 is an explanatory diagram of character coordinates of a character series.

Thus, when the character series "Word" is displayed at an origin of (0, 0), the display coordinates are as shown in FIG. 12.

Next the character display calculation section 15*a* of the display control section 15 calculates central coordinates of a character series from upper left coordinates (0, 0) for the character series "Word" and lower right coordinates (12, 30). The central coordinates (x, y) of the character series are calculated as shown below:

$$x=12/2=6$$

$$y=30/2=15$$

Figure 13:
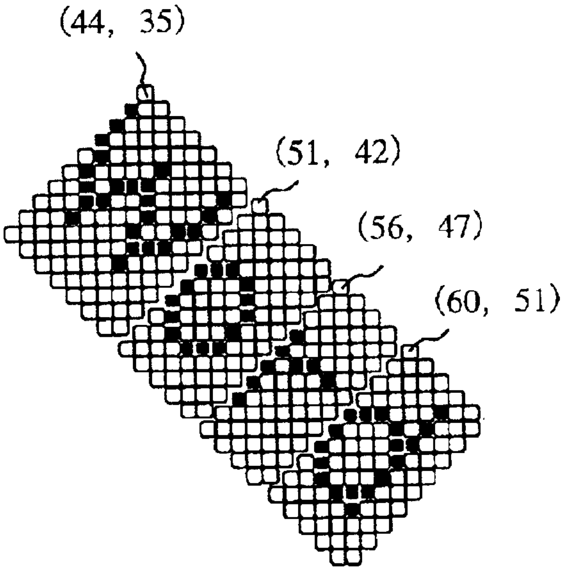
FIG. 13 is an explanatory diagram of character coordinates of a character series.

In this way, when the character series "Word" is displayed at a display reference position (50, 50) with a display angle of 315°, the display coordinates of each character are as shown in FIG. 13.

In this way, when calculating the display coordinates of each character, the display control section 15 reads character data for sloping characters "W", "o" "r" "d", from the character recording section 14 and displays each character comprising the character series on the display 16 (refer to FIG. 13). In this way, a series of operations are completed.

A method of calculation when 0° or 315° are input as display angles for a character display was explained above. The display coordinates for angles other than these are calculated by performing a process of rotating a character through 90° as discussed below.

Figure 35:
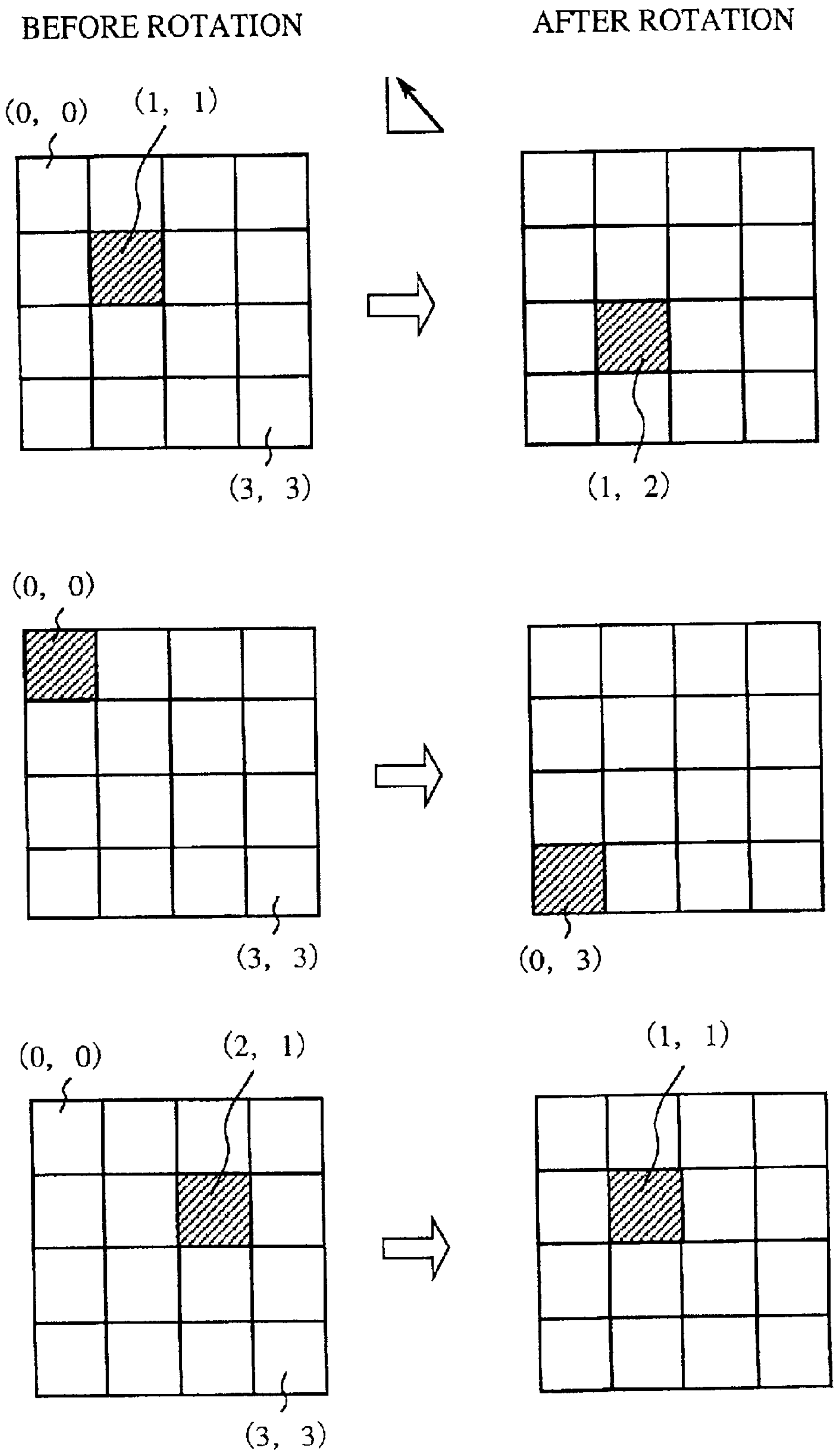
FIG. 35 is an explanatory diagram of the 90° rotation process for characters.

45°: rotate character at 315° through 90°
90°: rotate character at 0° through 90°
135°: rotate character at 315° through same process
180°: rotate character at 0° through same process
225°: rotate character at 45° through same process
270°: rotate character at 90° through same process For example, when a character having the same number of horizontal and vertical pixels is rotated through 90°, if it is assumed that the upper left coordinate of the character is (0, 0), the upper right coordinate is ($x_0$, $y_0$), the relationship of the coordinates before rotation ($x_1$ $y_1$) to those after rotation ($x_2$, $y_2$) (refer to FIG. 35) becomes $$x_2=y_1,$$

$$y_2=x_0-x_1.$$

Figure 14:
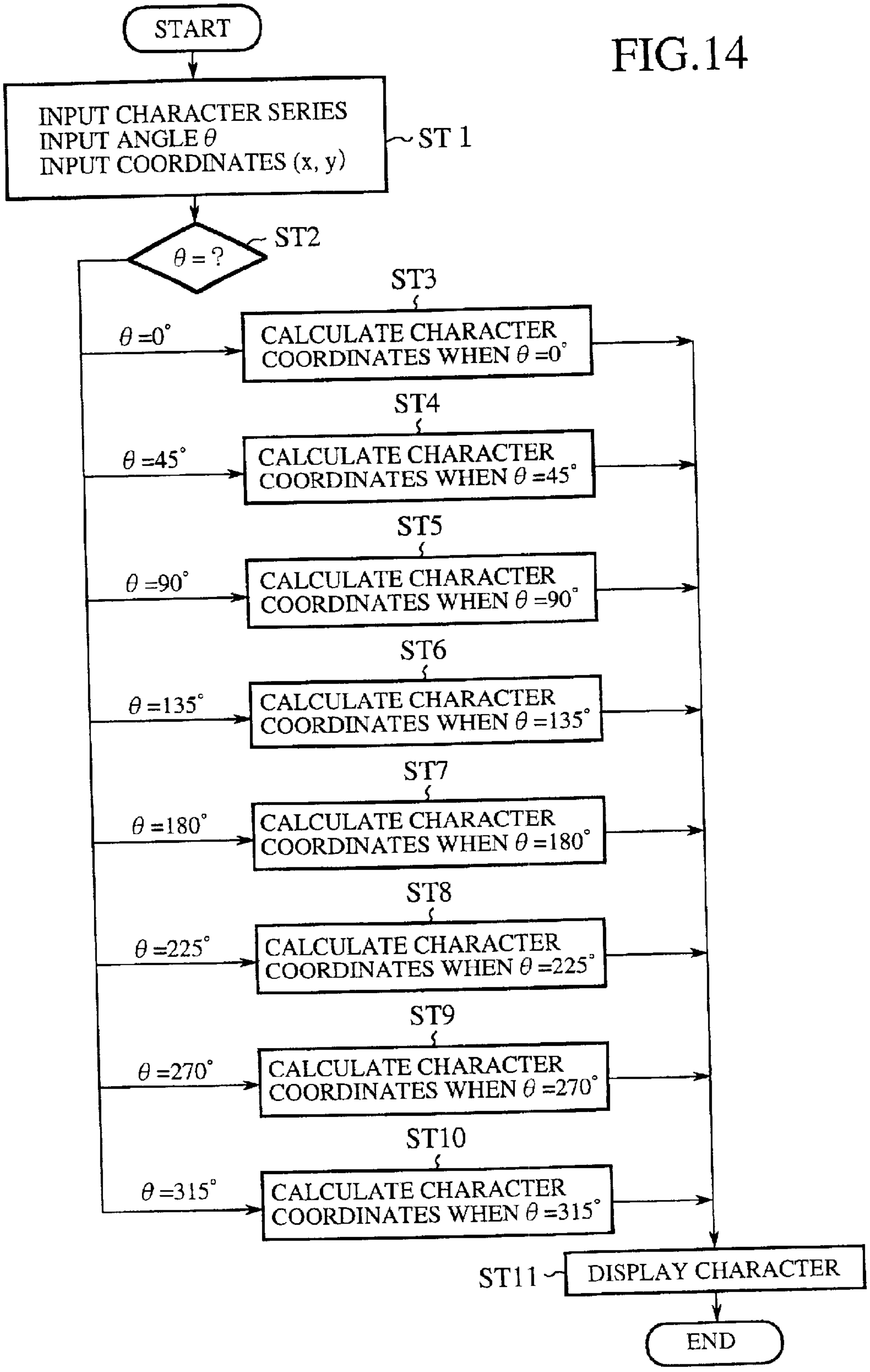
FIG. 14 is a flowchart showing the basic operation of a display control section in a first embodiment of the present invention.

FIG. 14 is a flowchart showing the basic operation of the display control section 15. The basic operation of the display control section 15 will be discussed below with reference to the figure.

Firstly, when a user inputs a character series to be displayed, a display angle θ of the character series and a display reference point (x, y) of the character series using the character input section 11, the angle input section 12 and the position input section 13 (step ST1), a display angle θ is determined (step ST2). Thereafter the display coordinates of each character is calculated in accordance with the display angle θ and the display reference position (x, y) and the like. Namely, when θ=0°, the character series coordinates with angle 0° are calculated in step ST3,
when θ=45°, the character series coordinates with angle 45° are calculated in step ST4,
when θ=90°, the character series coordinates with angle 90° are calculated in step ST5,
when θ=135°, the character series coordinates with angle 135° are calculated in step ST6,
when θ=180°, the character series coordinates with angle 180° are calculated in step ST7,
when θ=225°, the character series coordinates with angle 225° are calculated in step ST8,
when θ=270°, the character series coordinates with angle 270° are calculated in step ST9,
when θ=315°, the character series coordinates with angle 315° are calculated in step ST10.

The display control section 15 displays a character series on the display 16 on the basis of the calculated display coordinates (step ST11) and a series of operations is completed.

As is clear from the above, according to the first embodiment, a proximal reference point for each character which comprises a character series is obtained. Thus the display coordinates for each character are calculated from the display angle, display reference point and proximal reference point of the character series. Even when displaying a sloping character series, it is possible to display the character series with superior presentation.

Embodiment 2

In embodiment 1 above, 8 angles were input. However it is possible to input all angles from 0° to 360°. A concrete example will be discussed below.

Firstly, the calculation of a character display position will be explained. In a similar manner to embodiment 1, the character recording section 14 has character data for two types of characters: normal and sloping. Data for each character is recorded linked with a respective proximal reference point.

When a coordinate for a character series input by the character input section 11 is calculated, each character coordinate is calculated from tan θ with reference to the character series below according to a display angle θ input into the angle input section 12. However since the y axis is positive in the lower direction, tan is calculated in the display section 16 as a minus value.

Figure 15:
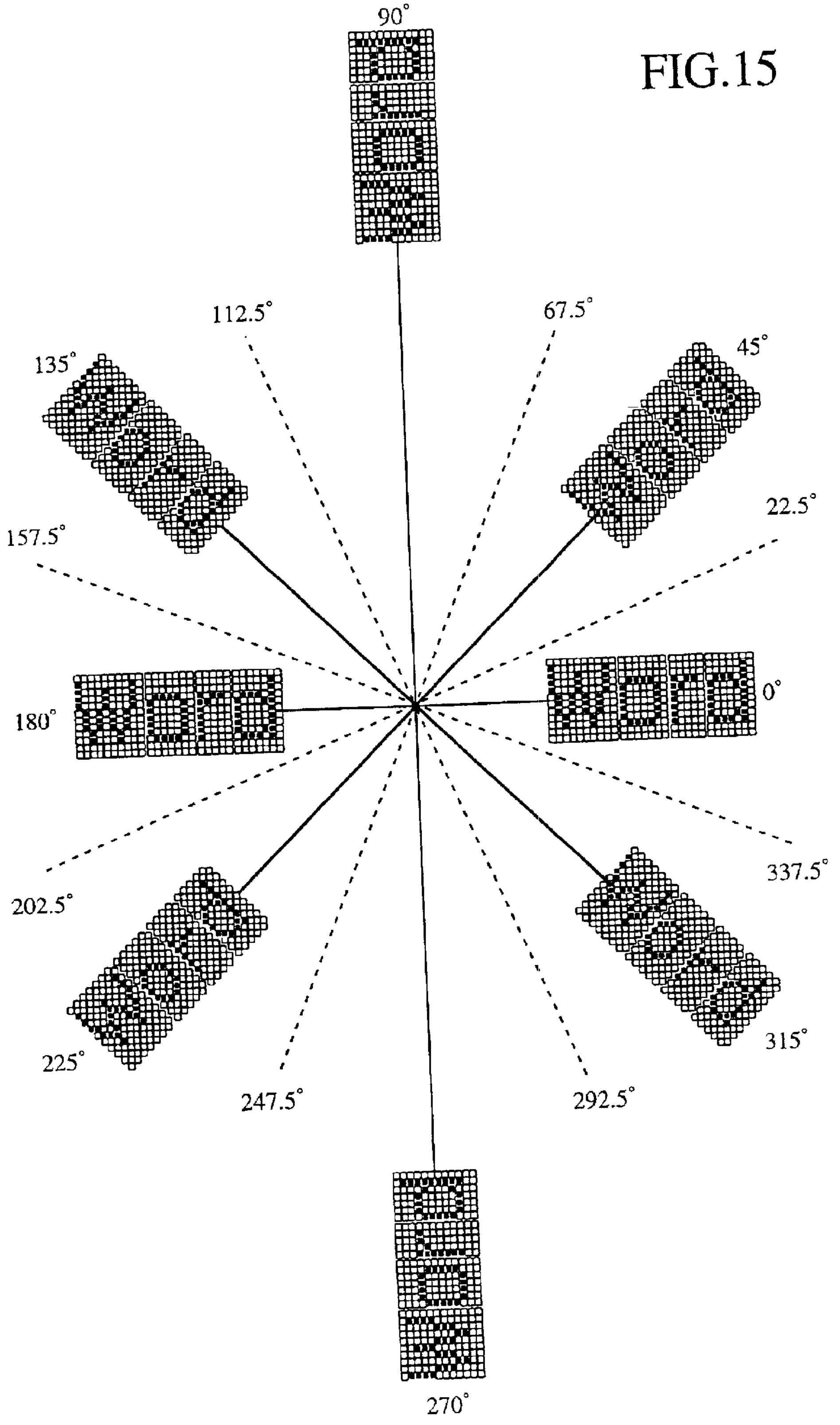
FIG. 15 is a diagram of a display of a character series.

−22.5°<θ≦22.5°→character series with angle 0° as reference
22.5°<θ≦67.5°→character series with angle 45° as reference
67.5°<θ≦112.5°→character series with angle 90° as reference
112.5°<θ≦157.5°→character series with angle 135° as reference
157.5°<θ≦202.5°→character series with angle 180° as reference
202.5°<θ≦247.5°→character series with angle 225° as reference
247.5°<θ≦292.5°→character series with angle 270° as reference
292.5°<θ≦337.5°→character series with angle 315° as reference The relationship of each character series and a display angle is as shown in FIG. 15.

The operation of the invention will be discussed below.

The user operates the character input section 11, the angle input section 12 and the position input section 13 and inputs a character series to be displayed, a display angle for the character series and a display reference point of the character series.

For example, when "Word" is input as a character series, an angle of 10° is input as a display angle and (50, 50) is input as a display reference point, from

−22.5°<10°≦22.5°, the display control section 15 calculates the display coordinates of the character series "Word" with a display angle of 10° from display coordinates for the character series "Word" with a display angle of 0°.

The display coordinates of the character series "Word" with a display angle of 0° when displayed at an origin (0, 0) are as shown in FIG. 10 according to embodiment 1.

Thus the display coordinates (x, y) of the character series "Word" with a display angle of 10° when displayed at an origin (0, 0) are as shown below.

From coordinates (0, 0) of "W" at 0°, the coordinates of "W" at 10° become $$x=0,$$

$$y=0\cdot(-\tan 10)=0$$

From coordinates (10, 0) of "o" at 0°, the coordinates of "o" at 10° become $$x=10,$$

$$y=10\cdot(-\tan 10)\approx-2$$

From coordinates (17, 0) of "r" at 0°, the coordinates of "r" at 10° become $$x=17,$$

$$y=17\cdot(-\tan 10)\approx-3$$

From coordinates (22, 0) of "d" at 0°, the coordinates of "d" at 10° become $$x=22,$$

$$y=22\cdot(-\tan 10)\approx-4.$$

From the proximal reference point (7, 0) of "d", the lower right coordinates of "d" become $$x=22+7=29,$$

$$y=-4+12=8.$$

Figure 16:
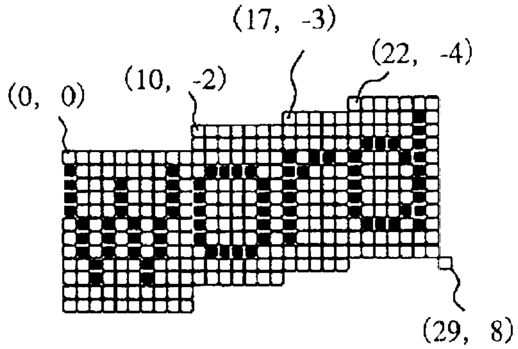
FIG. 16 is an explanatory diagram of display coordinates for a character series.

Thus, the display coordinates when the character series "Word" is displayed at an origin (0, 0) are as shown in FIG. 16.

Next the character display calculation section 15*a* of the display control section 15 calculates a central coordinate (x, y) of the character series from the upper left coordinate (0, 0) and the lower right coordinate (29, 8) of the character series "Word".

The central coordinate (x, y) of the character series is as shown below:

$$x=29/2\approx15$$

$$y=8/2=4$$

Figure 17:
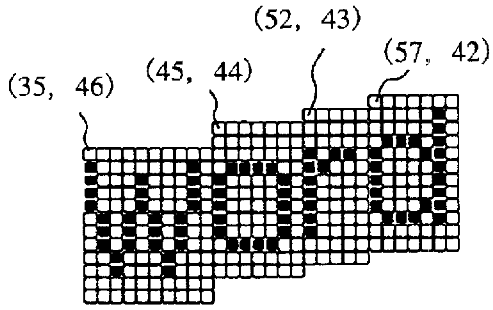
FIG. 17 is an explanatory diagram of display coordinates for a character series.

In this way, when the character series "Word" is displayed at a display reference point (50, 50) at a display angle of 10°, the display coordinates of each character are as shown in FIG. 17.

In this way, when the display coordinates of each character are calculated, the display control section 15 reads the character data for the normal characters "W", "o", "r", "d" from the character recording section 14 and displays each character comprising the character series on the display 16 (refer to FIG. 17). Thus a series of operations are completed.

Next the calculation of display coordinates for sloping characters will be explained.

Figure 18:
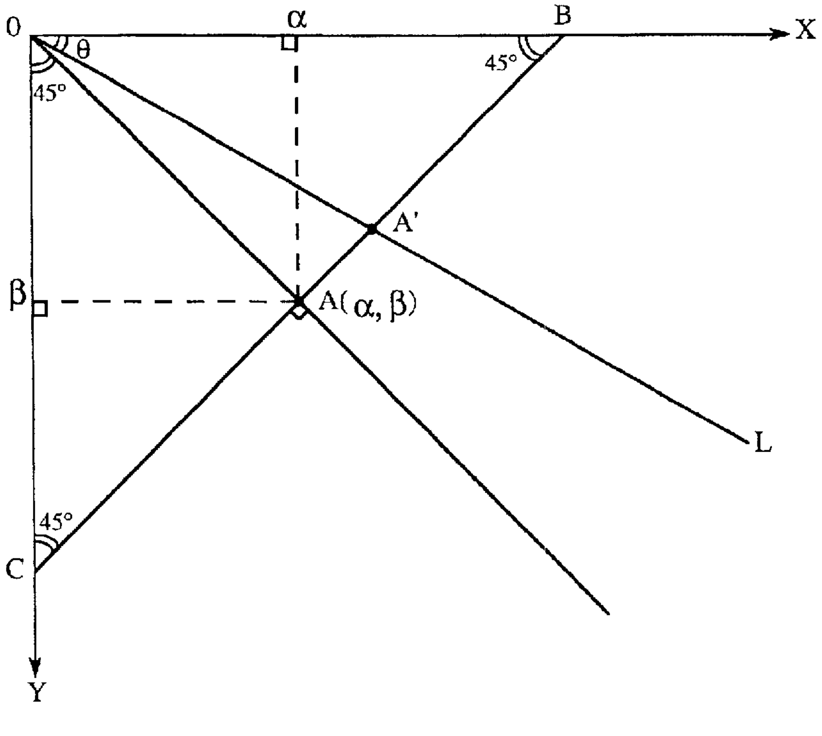
FIG. 18 is an expansion diagram of a character series display.

For example as shown in FIG. 18, the point of intersection is calculated of a straight line with an arbitrary angle of θ and a line is extended at 45° from the x and the y axes to the display coordinates A of an arbitrary character. The coordinates of the intersection point are taken to be the character coordinates A' of the angle θ.

And the coordinates of the intersection point are taken as a character coordinate A' of the angle θ.

In FIG. 18, the coordinates (α, β) of A have the value α=β since the angle of the straight line is 45°.

If B and C are taken to be the respective X and Y axis intersects of a straight line extended at an angle of 45° to the X and Y axes from A, Oβ=βC is established from the fact that the right angled triangles OβA, CβA are congruent.

Thus, the straight line BC is as shown below and the straight line L with an arbitrary angle of θ is expressed as shown below.

$$y=-x+2\beta$$

$$y=x\cdot\tan\theta$$

The x coordinate of the intersection point A' of the straight line L and the straight line BC are as shown below.

$$x\cdot\tan\theta=-x+2\beta$$

$$x\cdot(\tan\theta+1)=2\beta$$

$$x=2\beta/(\tan\theta+1)$$

The y coordinate is calculated from the x coordinate.

$$y=-x+2\beta$$

For example, when "Word" is input as a character series, 30° is input as a display angle and (50, 50) is input as a display reference position, from $$292.5°<300°\leqq337.5°,$$

the display control section 15 calculates the display coordinates of the character series "Word" when the display angle is 300° from the display coordinates of the character series "Word" when the display angle is 315°.

The display coordinates when the character series "Word" is displayed at an origin (0,0) at a display angle of 315° according to embodiment 1 are as shown in FIG. 12.

Thus the display coordinates (x, y) when the character series "Word" is displayed at an origin (0,0) at a display angle of 300° are as shown below.

From coordinates (0, 0) of "W" at 315°, the coordinates of "W" at 300° become $$x=2\cdot0/(-\tan 300+1)=0,$$

$$y=-0+2\cdot0=0.$$

From coordinates (7, 7) of "o" at 315°, the coordinates of "o" at 300° become $$x=2\cdot7/(-\tan 300+1)\approx5,$$

$$y=-5+2\cdot7=9$$

From coordinates (12, 12) of "r" at 315°, the coordinates of "r" at 300° become $$x=2\cdot12/(-\tan 300+1)\approx9,$$

$$y=-9+2\cdot12=15.$$

From coordinates (16, 16) of "d" at 315°, the coordinates of "d" at 300° become $$x=2\cdot16/(-\tan 300+1)\approx12b,$$

$$y=-12+2\cdot16=20.$$

From proximal reference point (5, 5) of "d", the lower right coordinates of "d" become $$x=12+5-9=8,$$

$$y=20+5+9=34.$$

Figure 19:
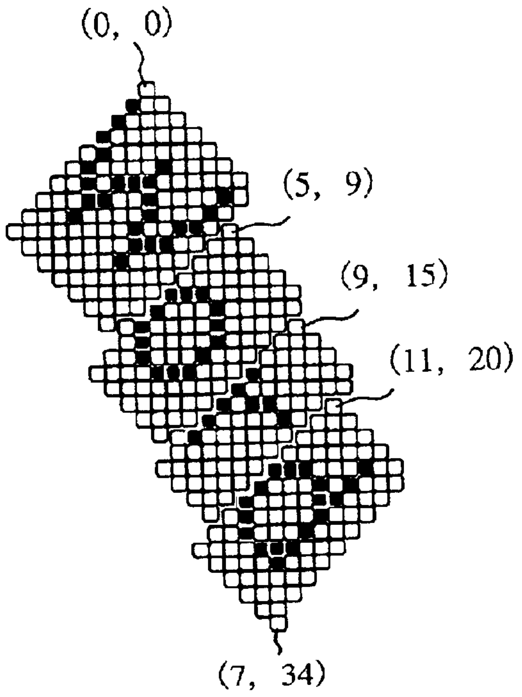
FIG. 19 is an explanatory diagram of display coordinates for a character series.

Thus, the display coordinates when the character series "Word" is displayed at an origin (0, 0) are as shown in FIG. 19.

Next the character display calculation section 15*a* of the display control section 15 calculates the central coordinates (x,y) of the character series from the upper left coordinates (0, 0) and the lower right coordinates (8, 34) of the character series "Word".

Thus the central coordinates (x,y) of the character series are as shown below.

$$x=8/2=4$$

$$y=34/2=17$$

Figure 20:
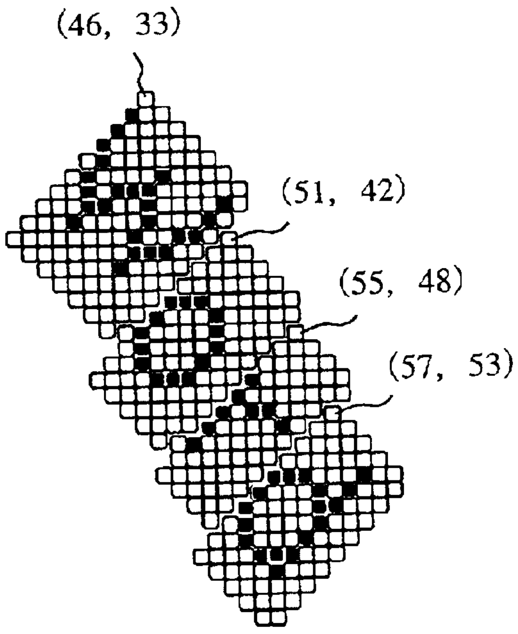
FIG. 20 is an explanatory diagram of display coordinates for a character series.

In such a way, when the character series "Word" is displayed at a display reference point (50, 50) at a display angle of 300°, the display coordinates of each character are as shown in FIG. 20.

Thus, when the display coordinates of each character are calculated, the display control section 15 reads the character data for each of the sloping characters "W", "o", "r", "d" from the character recording section 14 and displays each character which comprises the character series on a display 16 (refer to FIG. 20). Thus, a series of operations is completed.

A calculation method when 10° or 300° is input as a display angle of a character series was discussed above. However the display coordinates of other angles may be calculated by the method below.

22.5°<θ≦67.5°→90° rotation of character series with angle 292.5°<θ≦337.5°

67.5°<θ≦112.5°→90° rotation of character series with angle −22.5°<θ≦22.5°

112.5°<θ≦157.5°→same process as angle 292.5°<θ≦337.5°

157.5°<θ≦202.5°→same process as angle −22.5°<θ≦22.5°

202.5°<θ≦247.5°→same process as angle −22.5°<θ≦67.5°

247.5°<θ≦292.5°→same process as angle 67.5°<θ≦112.5°

Figure 21:
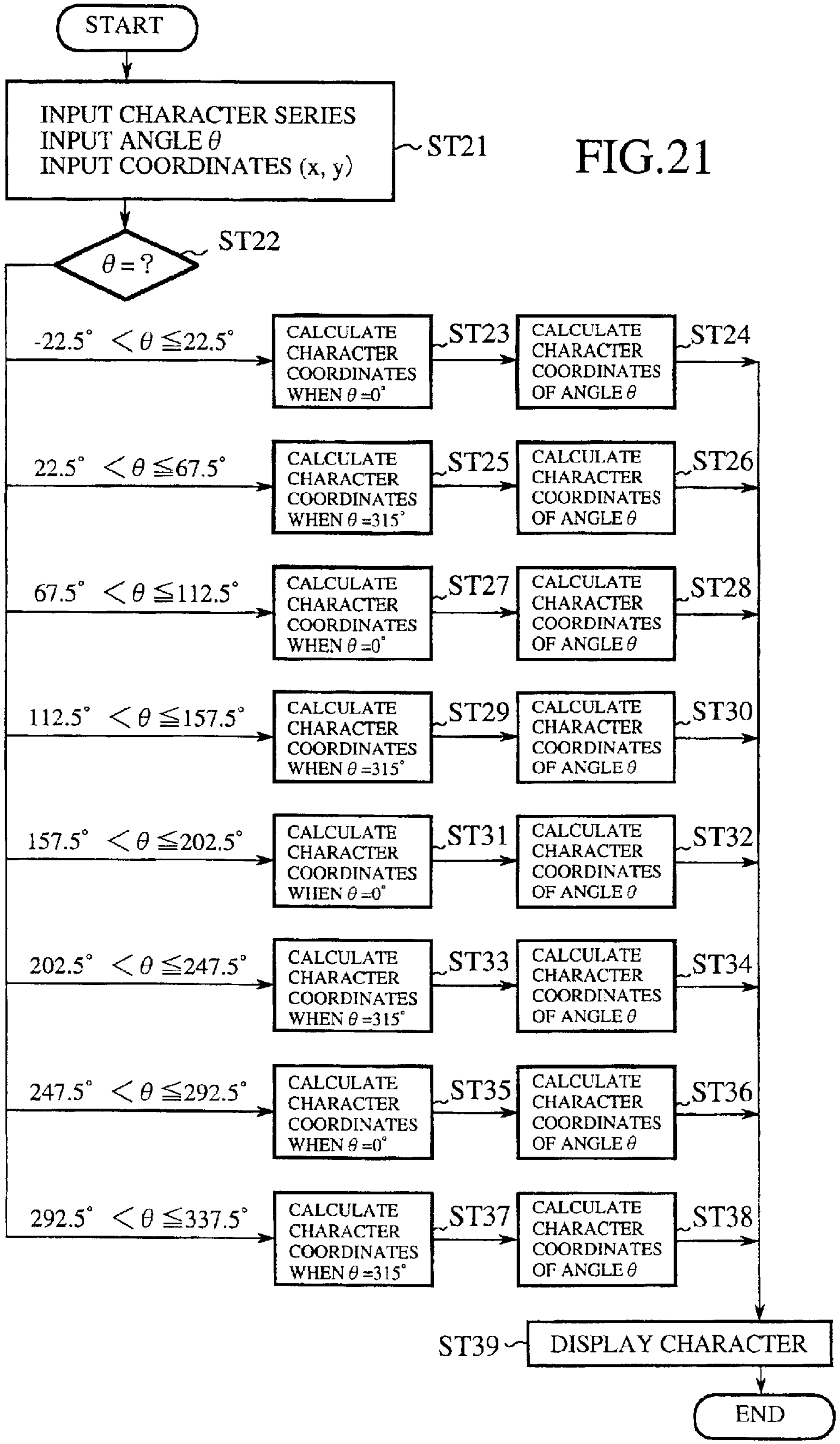
FIG. 21 is a flowchart showing the basic operation of the display control section in a second embodiment of the present invention.

FIG. 21 is a flowchart showing the basic operation of the display control section 15. The basic operation of the display control section 15 will be explained below with reference to the figure.

Firstly, when a user inputs a character series to be displayed, a display angle θ of the character series and a display reference point (x, y) of the character series using the character input section 11, the angle input section 12 and the position input section 13 (step ST21). A display angle θ is determined (step ST22). Thereafter the display coordinates of each character are calculated in accordance with the display angle θ and the display reference position (x, y).

When the display angle is −22.5°<θ≦22.5°, the character series coordinates for the angle 0° are calculated (step ST23), the character series coordinates are calculated for the display angle θ (step ST24).

When 22.5°<θ≦67.5°, the character series coordinates for the angle 315° are calculated (step ST25), the character series coordinates are calculated for the display angle θ (step ST26).

When 67.5°<θ≦112.5°, the character series coordinates for the angle 0° are calculated (step ST27), the character series coordinates are calculated for the display angle θ (step ST28).

When 112.5<θ≦157.5°, the character series coordinates for the angle 315° are calculated (step ST29), the character series coordinates are calculated for the display angle θ (step ST30).

When 157.5°<θ≦202.5°, the character series coordinates for the angle 0° are calculated (step ST31), the character series coordinates are calculated for the display angle θ (step ST32).

When 202.5°<θ≦247.5°, the character series coordinates for the angle 315° are calculated (step ST33), the character series coordinates are calculated for the display angle θ (step ST34).

When 247.5°<θ≦292.5°, the character series coordinates for the angle 0° are calculated (step ST35), the character series coordinates are calculated for the display angle θ (step ST36).

When 292.5°<θ≦337.5°, the character series coordinates for the angle 315° are calculated (step ST37), the character series coordinates are calculated for the display angle θ (step ST38).

The display control section 15 displays a character series on the display 16 on the basis of the calculated display coordinates (step ST39) and a series of operations is completed.

Embodiment 3

In embodiments 1 and 2 above, the character recording section 14 is adapted to record character data for two types of characters: normal and sloping. This distinction depends on the angle of the character series. However all character display may be conducted on the basis of only one type of normal character.

That is to say, in the embodiments 1 and 2, character series with an angle of 0°, 90°, 180° or 270° are all displayed as normal characters. However this display may be expanded to other angles. The display coordinates of each character may be calculated from tan θ with reference to the character series below depending on a display angle θ input from the angle input section 12. However in the display 16, tan is calculated as a minus since the y axis is positive in the lower direction.

−45°<θ≦45°→character series with angle 0° as reference

45°<θ≦135°→character series with angle 90° as reference

135°<θ≦225°→character series with angle 180° as reference

225°<θ≦315°→character series with angle 270° as reference

Figure 22:
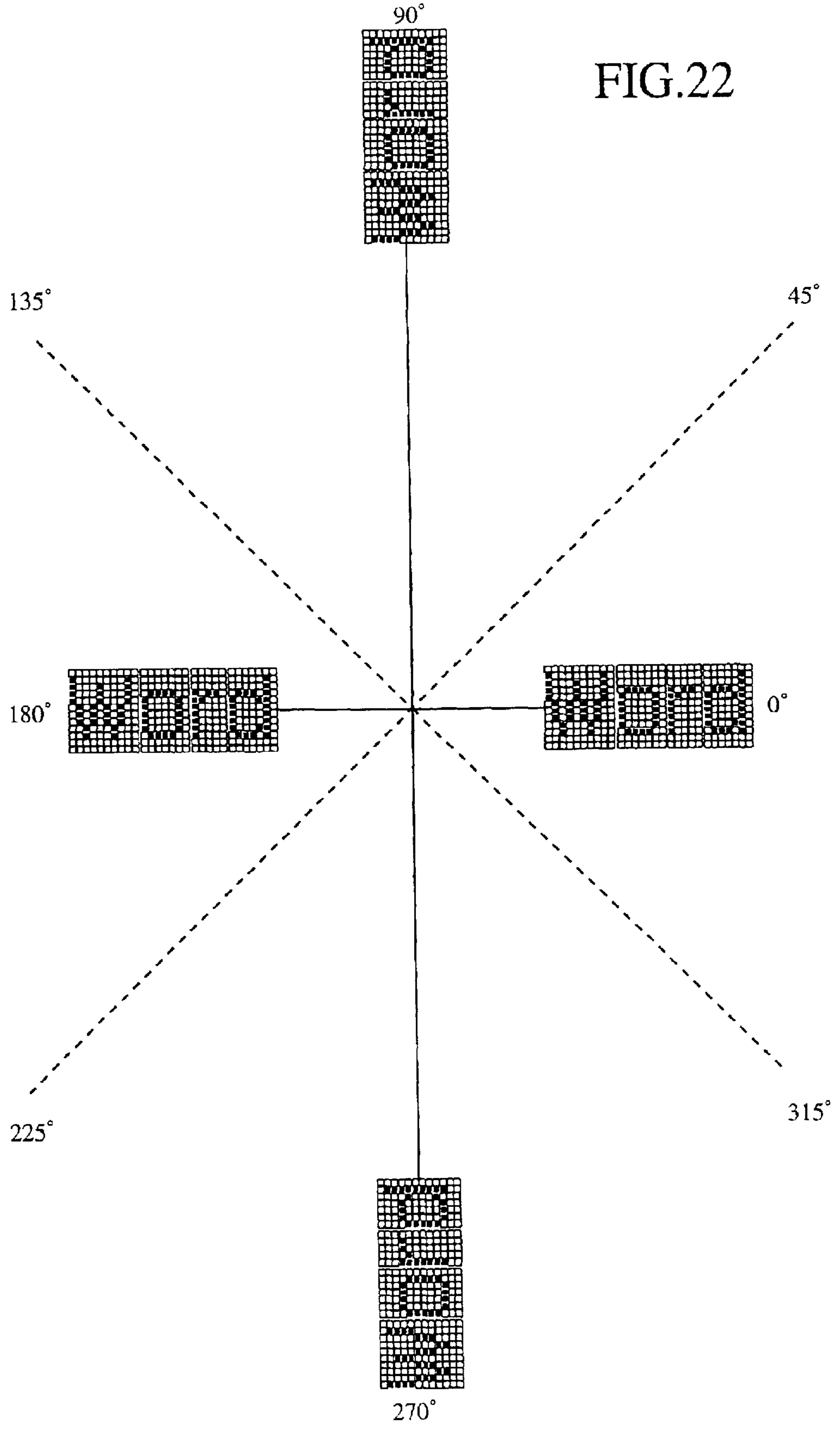
FIG. 22 is a diagram of a display of a character series.

The relationship of each character series and angle is shown in FIG. 22.

The operation of the invention will be discussed below.

A user inputs a character series to be displayed, a display angle of the character series and a display reference point of the character series using the character input section 11, the angle input section 12 and the position input section 13.

For example, when the character series "Word" is input with a display angle of 10° and a display reference position of (50, 50), from

−45°<10°≦45°, the character display calculation section 15*a* of the display control section 15 calculates the display coordinates of the character series "Word" when the display angle is 10° on the basis of the display coordinates of the character series "Word" when the display angle is 0°.

The display coordinates of the character series "Word" at a display angle of 0° according to embodiment 1 are as shown in FIG. 10.

Thus the display coordinates (x, y) when the character series "Word" is displayed at a display angle of 10° are as shown below.

From coordinates (0, 0) of "W" at 0°, the coordinates of "W" at 10° become $$x=0,$$

$$y=0\cdot(-\tan 10)=0.$$

From coordinates (10, 0) of "o" at 0°, the coordinates of "o" at 10° become $$x=10$$

$$y=10\cdot(-\tan 10)\approx -2.$$

Figure 23:
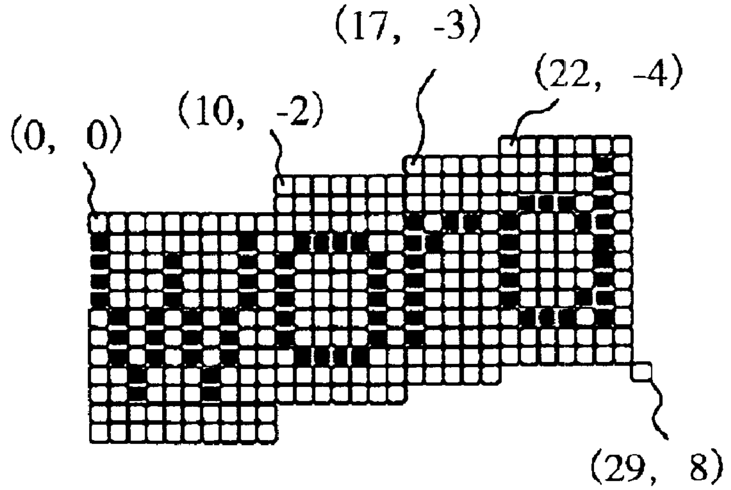
FIG. 23 is an explanatory diagram of display coordinates for a character series.

From coordinates (17, 0) of "r" at 0°, the coordinates of "r" at 10° become $x=17,$ $y=17\cdot(-\tan 10)\approx-3.$ From coordinates (22, 0) of "d" at 0°, the coordinates of "d" at 10° become $x=22,$ $y=22\cdot(-\tan 10)\approx-4.$ From proximal reference point (7, 0) of "d", the lower right coordinates of "d" become $x=22+7=29,$ $y=-4+12=8.$ Thus, the display coordinates when the character series "Word" is displayed at an origin (0, 0) are as shown in FIG. 23.

Next the character display calculation section 15*a* of the display control section 15 calculates the central coordinates (x, y) of the character series from the upper left coordinates (0, 0) and the lower right coordinates (29, 8) of the character series "Word".

Thus, the central coordinates (x, y) of the character series are as shown below.

$x=29/2\approx15$ $y=8/2=4$

Figure 24:
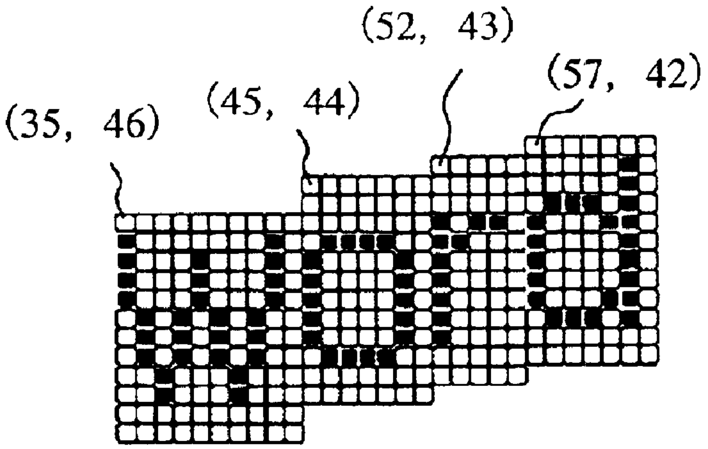
FIG. 24 is an explanatory diagram of display coordinates for a character series.

In such a way, when the character series "Word" is displayed at a display reference point (50, 50) at a display angle of 10°, the display coordinates of each character are as shown in FIG. 24.

Thus when the display coordinates of each character are calculated, the display control section 15 reads the character data for each of the normal characters "W", "o", "r", "d" from the character recording section 14 and displays each character which comprises the character series on the display 16 (refer to FIG. 24). Thus a series of operations is completed.

A calculation method when 10° is input as a display angle of a character series was discussed above. However the display coordinates of other angles may be calculated by the method below.

$45°<\theta\leqq135°\rightarrow90°$ rotation of character series with angle $-45°<\theta\leqq45°$ $135°<\theta\leqq225°\rightarrow$same process as angle $-45°<\theta\leqq45°$ $225<\theta\leqq315°\rightarrow$same process as angle $45°<\theta\leqq135°$ Embodiment 4

In embodiment 1 and 2 above, a method of only handling sloping characters with an angle of slope of 45° was discussed. However it is possible to handle a plurality of types of sloping characters with mutually differing angles of slope.

For example, a proximal reference point and character data relating to a sloping character with an angle of slope of 30° and a sloping character with an angle of slope of 60° may be recorded. A sloping character may be then used depending on the display angle of the character series.

In this way, the presentation of the character series may be further improved as it is possible to use more suitably sloping characters depending on the display angle of the character series.

Embodiment 5

In embodiments 1 to 4, a proportional font was discussed in which each character has a fixed character width. However a non-proportional font in which the character width of all characters is standardized may also be used to obtain the same effect as embodiment 1. However when characters with a narrow character width are contained in the character series, a section of the character series may appear distorted.

The character recording section 14 records non-proportional font character data in which all characters have the same standardized character width with respect to both types of character: normal and sloping.

Figure 25:
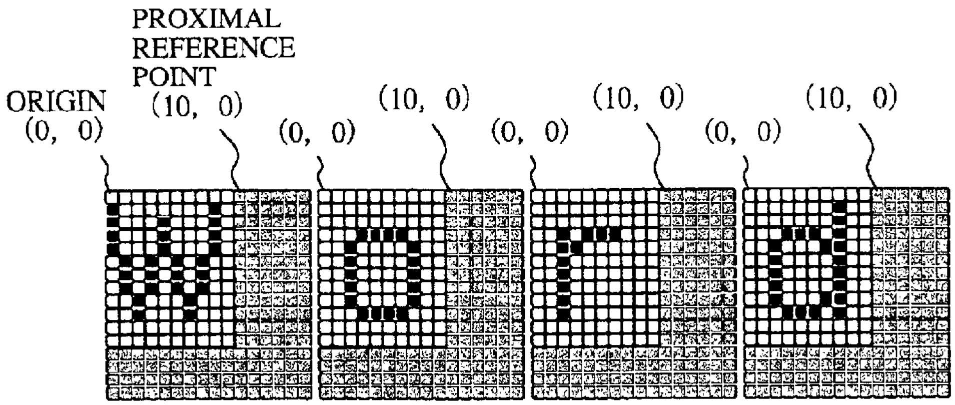
FIG. 25 is an enlargement of character data for normal characters.
Figure 26:
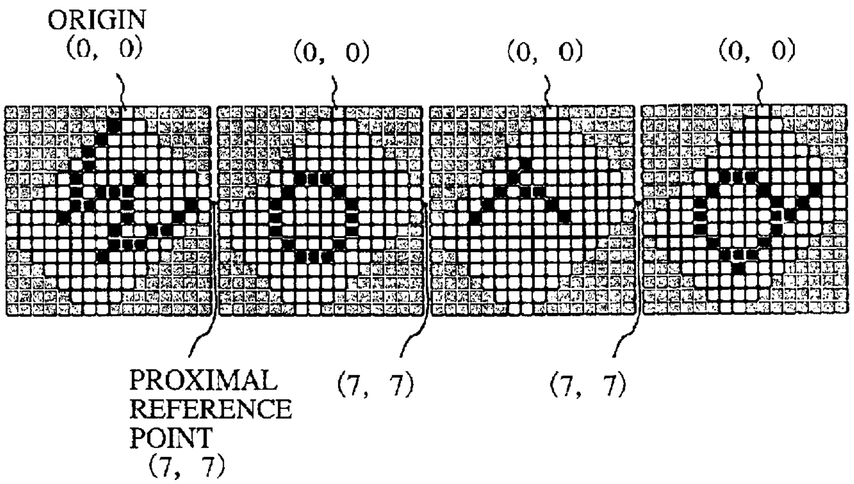
FIG. 26 is an enlargement of character data for sloping characters.

FIG. 25 and FIG. 26 are respective enlargements of normal and sloping characters. The proximal reference points of the normal character (for example: Word) are all (10, 0), the proximal reference points of a sloping character are all (7, 7).

Figure 27:
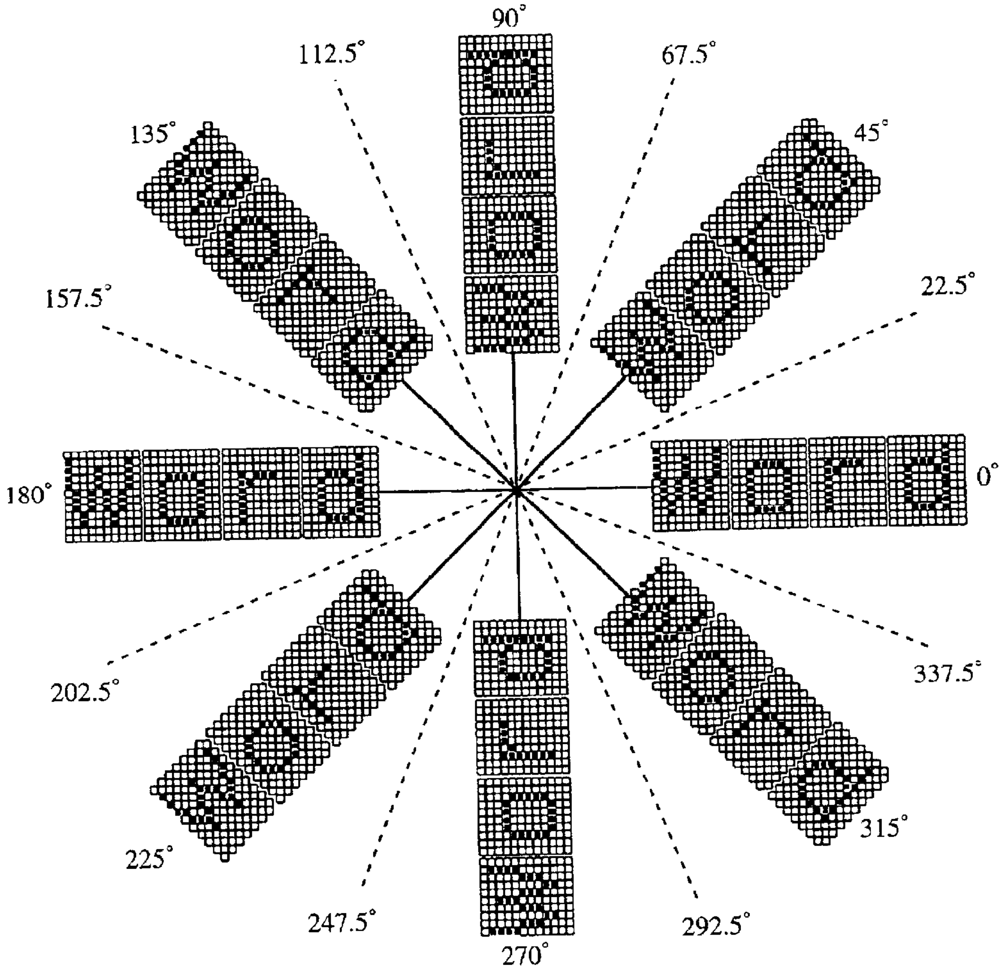
FIG. 27 is a diagram of a display of a character series.

The display of a character series is as shown in FIG. 27.

When coordinates of a character series input from a character input section 11 are calculated, each character coordinate is calculated from tan θ with reference to the character series below according to a display angle θ input into the angle input section 12. However since the y axis is positive in the lower direction, tan is calculated in the display section 16 as a minus value.

$-22.5°<\theta\leqq22.5°\rightarrow$character series with angle 0° as reference $22.5°<\theta\leqq67.5°\rightarrow$character series with angle 45° as reference $67.5°<\theta\leqq112.5°\rightarrow$character series with angle 90° as reference $112.5°<\theta\leqq157.5°\rightarrow$character series with angle 135° as reference $157.5°<\theta\leqq202.5°\rightarrow$character series with angle 180° as reference $202.5°<\theta\leqq247.5°\rightarrow$character series with angle 225° as reference $247.5°<\theta\leqq292.5°\rightarrow$character series with angle 270° as reference $292.5°<\theta\leqq337.5°\rightarrow$character series with angle 315° as reference.

The operation of the invention will be discussed below.

The user operates the character input section 11, the angle input section 12 and the position input section 13 and inputs a character series to be displayed, a display angle for the character series and a display reference point of the character series.

For example, when "Word" is input as a character series, an angle of 10° is input as a display angle and (50, 50) is input as a display reference point, thus from $-22.5°<10°\leqq22.5°,$ the character display calculation section 15*a* of the display control section 15 calculates the display coordinates of the character series "Word" with a display angle of 10° from display coordinates for the character series "Word" with a display angle of 0°.

Figure 28:
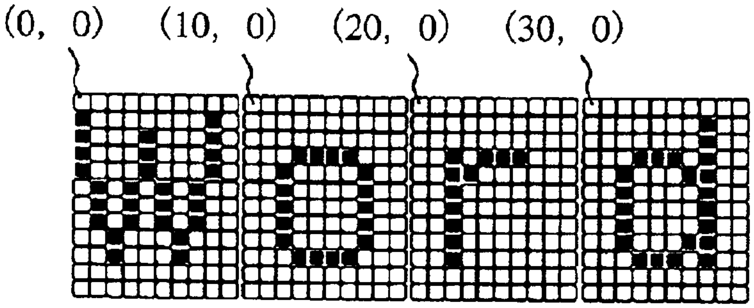
FIG. 28 is an explanatory diagram of display coordinates of a character series.

The display coordinates when the character series "Word" has a display angle of 0° and is displayed at an origin (0, 0) are as shown in FIG. 28 as the positional coordinates of the character in the nth character series is calculated by $x=(n-1)\cdot10$, $y=0$.

Thus, the display coordinates (x, y) of the character series "Word" with a display angle of 10° when displayed at an origin (0, 0) are as shown below.

From coordinates (0, 0) of "W" at 0°, the coordinates of "W" at 10° become $$x=0,$$

$$y=0\cdot(-\tan 10)=0.$$

From coordinates (10, 0) of "o" at 0°, the coordinates of "o" at 10° become $$x=10,$$

$$y=10\cdot(-\tan 10)\approx-2.$$

From coordinates (20 ,0) of "r" at 0°, the coordinates of "r" at 10° become $$x=20,$$

$$y=20\cdot(-\tan 10)\approx-4.$$

From coordinates (30, 0) of "d" at 0°, the coordinates of "d" at 10° become $$x=30,$$

$$y=30\cdot(-\tan 10)\approx-5.$$

From the proximal reference point (10, 0) of "d", the lower right coordinates of "d" become $$x=30+10=40,$$

$$y=-5+12=7.$$

Figure 29:
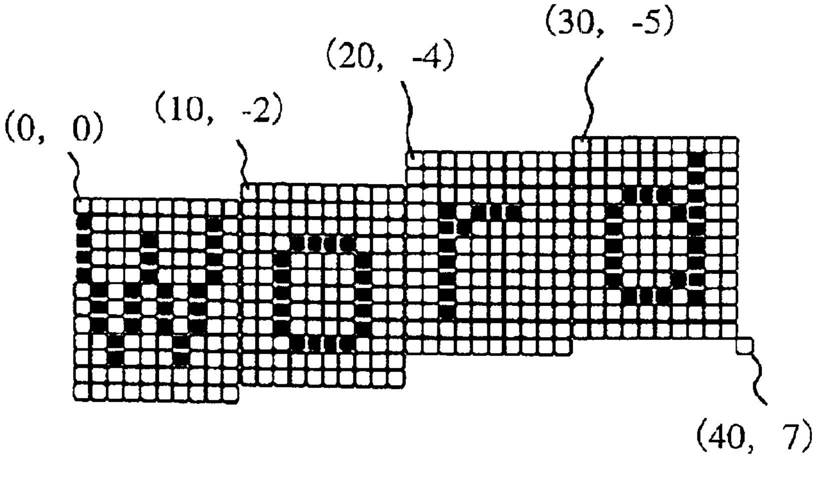
FIG. 29 is an explanatory diagram of display coordinates of a character series.

Thus, the display coordinates when the character series "Word" is displayed at an origin (0, 0) are as shown in FIG. 29.

Next the character display calculation section 15*a* of the display control section 15 calculates a central coordinate (x, y) of the character series from the upper left coordinate (0, 0) and the lower right coordinate (40, 7) of the character series "Word".

The central coordinates (x, y) of the character series are as shown below:

$$x=40/2=20$$

$$y=7/2\approx4$$

Figure 30:
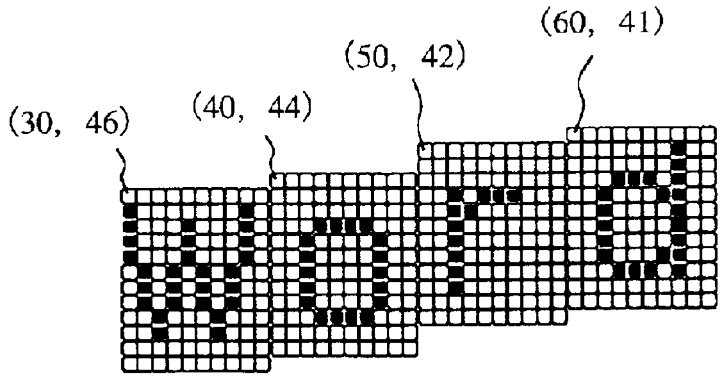
FIG. 30 is an explanatory diagram of display coordinates of a character series.

In this way, when the character series "Word" is displayed at a display reference point (50, 50) at a display angle of 10°, the display coordinates of each character are as shown in FIG. 30.

Thus when the display coordinates of each character are calculated, the display control section 15 reads the character data for the normal characters "W", "o", "r", "d" from the character recording section 14 and displays each character comprising the character series on the display 16 (refer to FIG. 30). Therefore a series of operations are completed.

Figure 31:
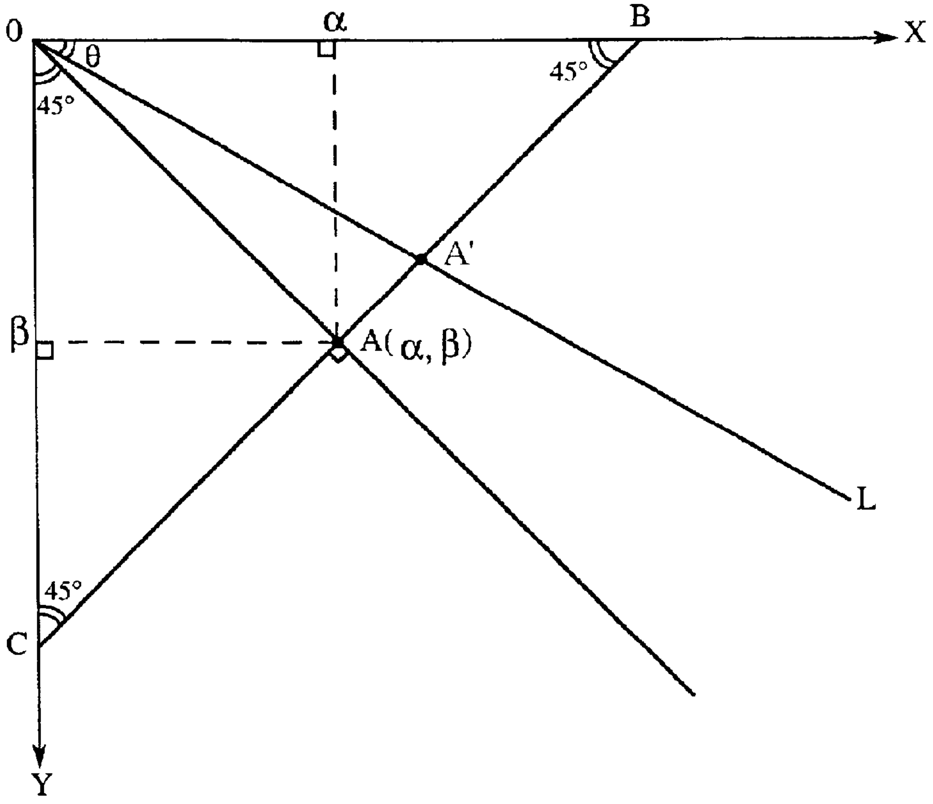
FIG. 31 is an expansion diagram of a character series display.

Next when displaying sloping characters, as shown in FIG. 31, the coordinates of a point of intersection are calculated of a straight line L having an angle of θ with a straight line which is orthogonal to the straight line on coordinate A disposed on the straight line with an angle of 45°.

In FIG. 31, the relationship of the coordinates (α, β) of A and the coordinates of coordinate A' which is disposed on a straight line L which has an angle θ is as shown below on the basis of embodiment 2.

$$y=2\beta/(\tan\theta+1)$$

$$y=-x+2\beta$$

For example, when the character series "Word" is input with an angle of display of 30° and display reference position of (50, 50), from 292.5°<300°≦337.5°, the character display calculation section 15*a* of the display control section 15 calculates the display coordinates of the character series "Word" when the display angle is 300° from the display coordinates of the character series "Word" when the display angle is 315°.

Figure 32:
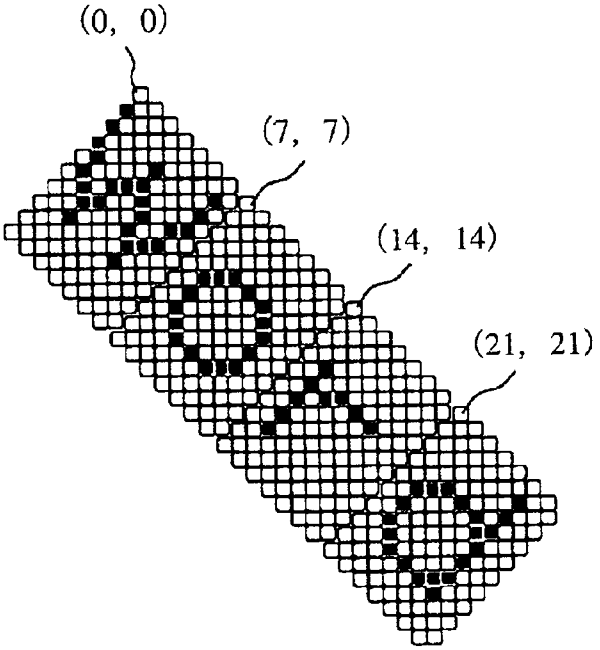
FIG. 32 is an explanatory diagram of display coordinates for a character series.

The display coordinates (x, y) of the character series "Word" with a display angle of 315° when displayed at an origin (0, 0) are as shown in FIG. 32 as the positional coordinates (x, y) of the character in the nth character series are calculated by $$x=(n-1)\cdot7,\ y=(n-1)\cdot7.$$

Thus, the display coordinates (x, y) of the character series "Word" with a display angle of 10° when displayed at an origin (0, 0) are as shown below.

From coordinates (0, 0) of "W" at 315°, the coordinates of "W" at 300° become $$x=2\cdot0/(-\tan 300+1)=0,$$

$$y=-0+2\cdot0=0.$$

From coordinates (7, 7) of "o" at 315°, the coordinates of "o" at 300° become $$x=2\cdot7/(-\tan 300+1)\approx5,$$

$$y=-5+2\cdot7=9.$$

From coordinates (14, 14) of "r" at 315°, the coordinates of "r" at 300° become $$x=2\cdot14/(-\tan 300+1)\approx10,$$

$$y=-10+2\cdot14=18.$$

From coordinates (21, 21) of "d" at 315°, the coordinates of "d" at 300° become $$x=2\cdot21/(-\tan 300+1)\approx15,$$

$$y=-15+2\cdot21=27.$$

From the proximal reference point (7, 7) of "d", the lower right coordinates of "d" become $$x=15+7-9=13,$$

$$y=27+7+9=43.$$

Figure 33:
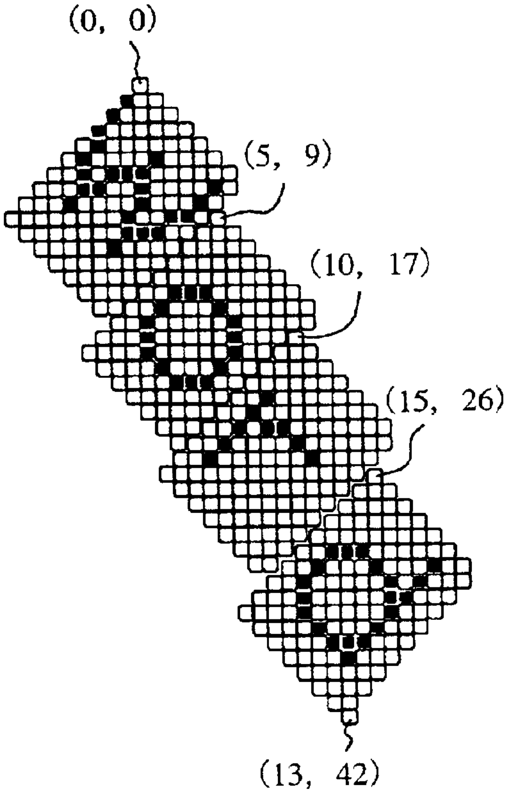
FIG. 33 is an explanatory diagram of display coordinates for a character series.

Thus, the display coordinates when the character series "Word" is displayed at an origin (0, 0) are as shown in FIG. 33.

Next the character display calculation section 15*a* of the display control section 15 calculates a central coordinates (x, y) of the character series from the upper left coordinate (0, 0) and the lower right coordinate (13, 43) of the character series "Word".

The central coordinates (x, y) of the character series are as shown below:

$$x=13/2\approx7$$

$$y=43/2\approx22$$

Figure 34:
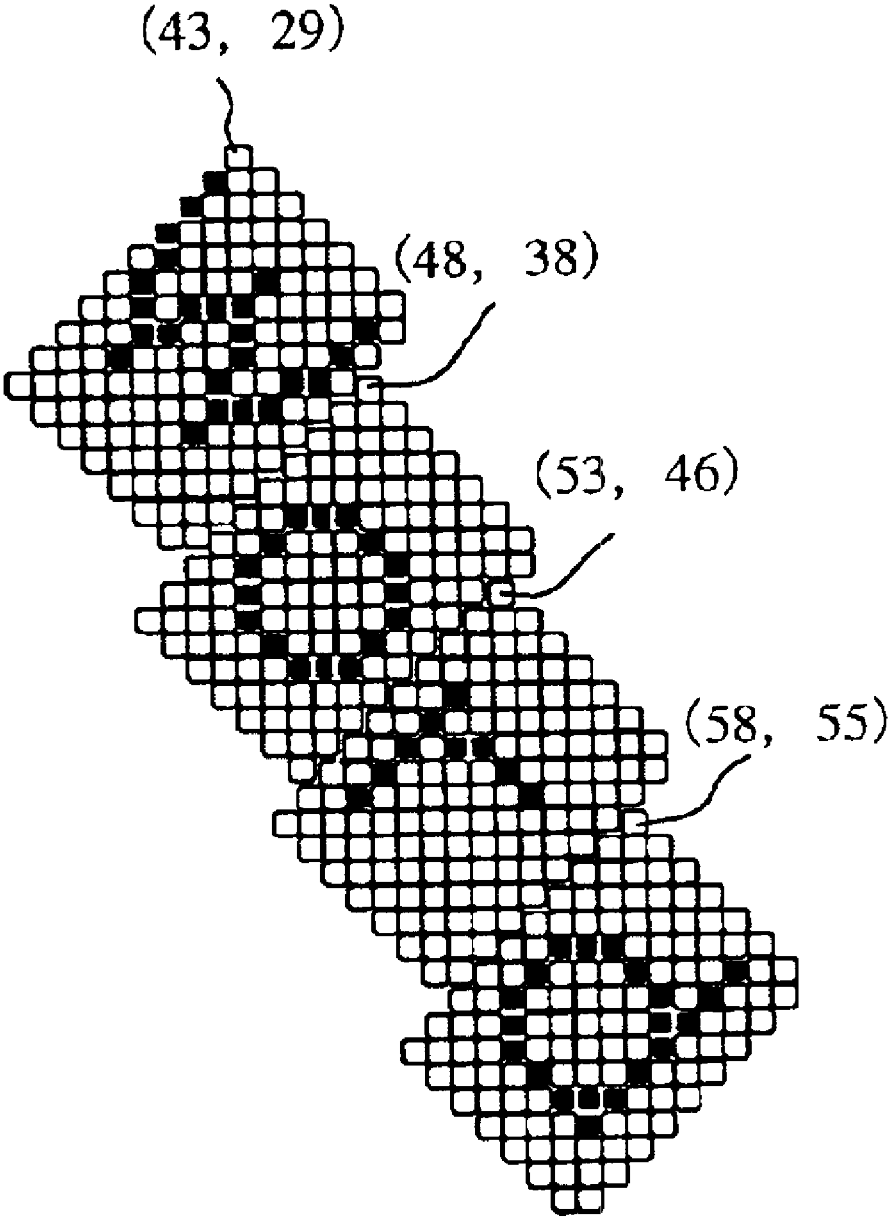
FIG. 34 is an explanatory diagram of display coordinates for a character series.

In this way, when the character series "Word" is displayed at a display reference point (50, 50) at a display angle of 300°, the display coordinates of each character are as shown in FIG. 34.

Thus, when the display coordinates of each character are calculated, the display control section 15 reads the character data for the sloping characters "W", "o", "r", "d" from the character recording section 14 and displays each character comprising the character series on the display 16 (refer to FIG. 34). Therefore a series of operations are completed.

A method of calculating display angles of 10° and 300° was explained above. Other angles may be calculated as explained in embodiment 2 above and therefore such explanation will be omitted.

Embodiment 6

In embodiments 1 to 5, the display of display reference positions input from a position input section 13 on the display 16 as central coordinates of a character series input from the character input section 11 was explained. However display reference positions input from a position input section 13 may also be displayed on the display 16 as the upper left coordinate of the character series input from the character input section 11. Therefore, the same effect as embodiment 1 may be achieved.

Embodiment 7

Embodiments 1 to 6 above were explained on the basis of a user inputting information (hereafter character series information) relating to a character series to be displayed, the display angle and display reference position of the character series. However, it is possible to read character series information recorded on a preset memory (for example FD, CD or the like) and display the calculated display coordinates of each character.

In this way, it is possible to display a preset character series at an arbitrary angle.

As shown above, the character display device and method therefor of the present invention is adapted for use with personal computers and navigation devices which need to display character series which slope at an arbitrary angle.

What is claimed is:

1. A character display device to display one or more characters without modification, comprising:

a recording means recording a dot pattern and a proximal reference point of each character of a character series;

a coordinate calculation means obtaining said proximal reference point of each character of said character series from said recording means and calculating a display position of each character from a display angle, display reference position, said proximal reference point and a proximal reference point of said character series; and a display means obtaining said dot pattern for each character of said character series from said recording means and displaying each character based on said calculated display position of each character calculated by said coordinate calculation means.

2. A character display device according to claim 1, wherein, when said recording means records dot patterns and proximal reference points of sloping characters which slope at an arbitrary angle apart from normal non-sloping characters, said display means and said coordinate calculation means select a normal character or a sloping character depending on a display angle of said character series and obtain dot patterns and proximal reference points of said selected characters.

3. A character display device according to claim 1, wherein said display means and said coordinate calculation means compare an angle of slope of a normal and a sloping character with said display angle of said character series and select a normal character or a sloping character having angle of slope most approximating said display angle.

4. A character display device according to claim 1, further comprising an input means allowing input of said character series to be displayed, and said display angle and said display reference position of said character series.

5. A character display device according to claim 1, further comprising a reading means reading said character series to be displayed being recorded in a memory, and said display angle and said display reference position of said character series.

6. A method of character display to display one or more characters without modification, comprising the steps of:

obtaining a proximal reference point of each character of a character series;

calculating, through a coordinate calculation means, a display position of each character from a display angle, display reference position, said proximal reference point and a proximal reference point of said character series;

obtaining a dot pattern for each character of said character series; and displaying each character based on said calculated display position of each character calculated by said coordinate calculation means.

7. A character display method according to claim 6, further comprising the step of selecting a normal character or a sloping character depending on a display angle of said character series and obtaining dot patterns and proximal reference points of said selected characters, when said recording means records dot patterns and proximal reference points of sloping characters which slope at an arbitrary angle apart from normal non-sloping characters.

8. A character display method according to claim 7, further comprising the steps of:

comparing an angle of slope of a normal and a sloping character with a display angle of a character series; and selecting a normal character or a sloping character having an angle of slope most approximating said display angle.

9. A character display method according to claim 6, further comprising the step of inputting a character series to be displayed, and a display angle and display reference position of said character series.

10. A character display method according to claim 6, further comprising the step of reading a character series to be displayed being recorded in a memory, and a display angle and display reference position of said character series.

11. An apparatus which displays one or more characters of a character string in a desired position on a display device without modification, comprising:

a data input section in which character display data is provided by a user;

a character recorder which records a dot pattern and a proximal reference point of each character;

a character display calculator that obtain said proximal reference point for each character and calculates display coordinates of said dot pattern of each character based on the character display data; and a display control that controls a positional display of each character based on the calculated display coordinates.

12. The apparatus of claim 11, wherein the character display data includes the characters to be displayed, an angle of display and a position of display.

13. A method for displaying one or more characters of a character string in a desired position on a display device without modification, comprising the steps of:

inputting character display data;

recording a dot pattern and a proximal reference point of each character of said character string;

obtaining said proximal reference point for each character;

calculating display coordinates of said dot pattern of each character based on the proximal reference points and the character display data; and displaying each character based on the calculated display coordinates.

14. The method of claim 13, wherein the character display data includes the characters to be displayed, an angle of display and a position of display.

15. An apparatus which displays one or more characters of a character string in a desired position on a display device, comprising:

a data input section in which character display data is provided by a user;

a character recorder which records a dot pattern and a proximal reference point of each character;

a character display calculator that obtains said proximal reference point for each character and calculates display coordinates of said dot pattern of each character based on the character display data; and a display control that controls a display position of each character based on the calculated display coordinates;

wherein dimensions of each character are maintained upon displaying each character at said display position.

* * * * *